United States Patent [19]
Brennon

[11] Patent Number: 5,351,645
[45] Date of Patent: Oct. 4, 1994

[54] TRANSPORTABLE ANIMAL SUSTENANCE DISPENSING DEVICE

[76] Inventor: Rebecca Brennon, 6321 N. 100th St., Milwaukee, Wis. 53225

[21] Appl. No.: 125,928

[22] Filed: Sep. 23, 1993

[51] Int. Cl.$^5$ ............................................. A01K 31/00
[52] U.S. Cl. ..................................... 119/18; 119/52.3
[58] Field of Search ...................... 119/18, 51.5, 52.1, 119/52.3, 54, 56.1, 74, 75

[56] References Cited

U.S. PATENT DOCUMENTS

| | | | |
|---|---|---|---|
| 2,943,600 | 7/1960 | Rosoff | 119/18 |
| 3,782,334 | 1/1974 | Leon et al. | 119/51.5 X |
| 4,422,409 | 12/1983 | Walker et al. | 119/51.5 X |
| 4,450,790 | 5/1984 | Stansbury, Jr. | 119/51.5 X |
| 4,800,844 | 1/1989 | Van Gilet | 119/51.5 |

*Primary Examiner*—Thomas Price
*Attorney, Agent, or Firm*—Nilles & Nilles

[57] ABSTRACT

A transportable animal sustenance dispensing device is resistant to spillage, requires less filling, and is easily attachable to a variety of crates. The sustenance dispensing device comprises a reservoir for storing sustenance; a sustenance container which receives sustenance from said reservoir, said container being movable between a closed container position in which said container is resistant to sustenance spillage and an open container position in which said sustenance is accessible by said animal; and a spring biased valve for controlling flow of said sustenance from said reservoir into said sustenance container. An animal sustenance dispensing device of the present invention further comprises a connector for attaching the dispensing device to an animal containment device.

7 Claims, 2 Drawing Sheets

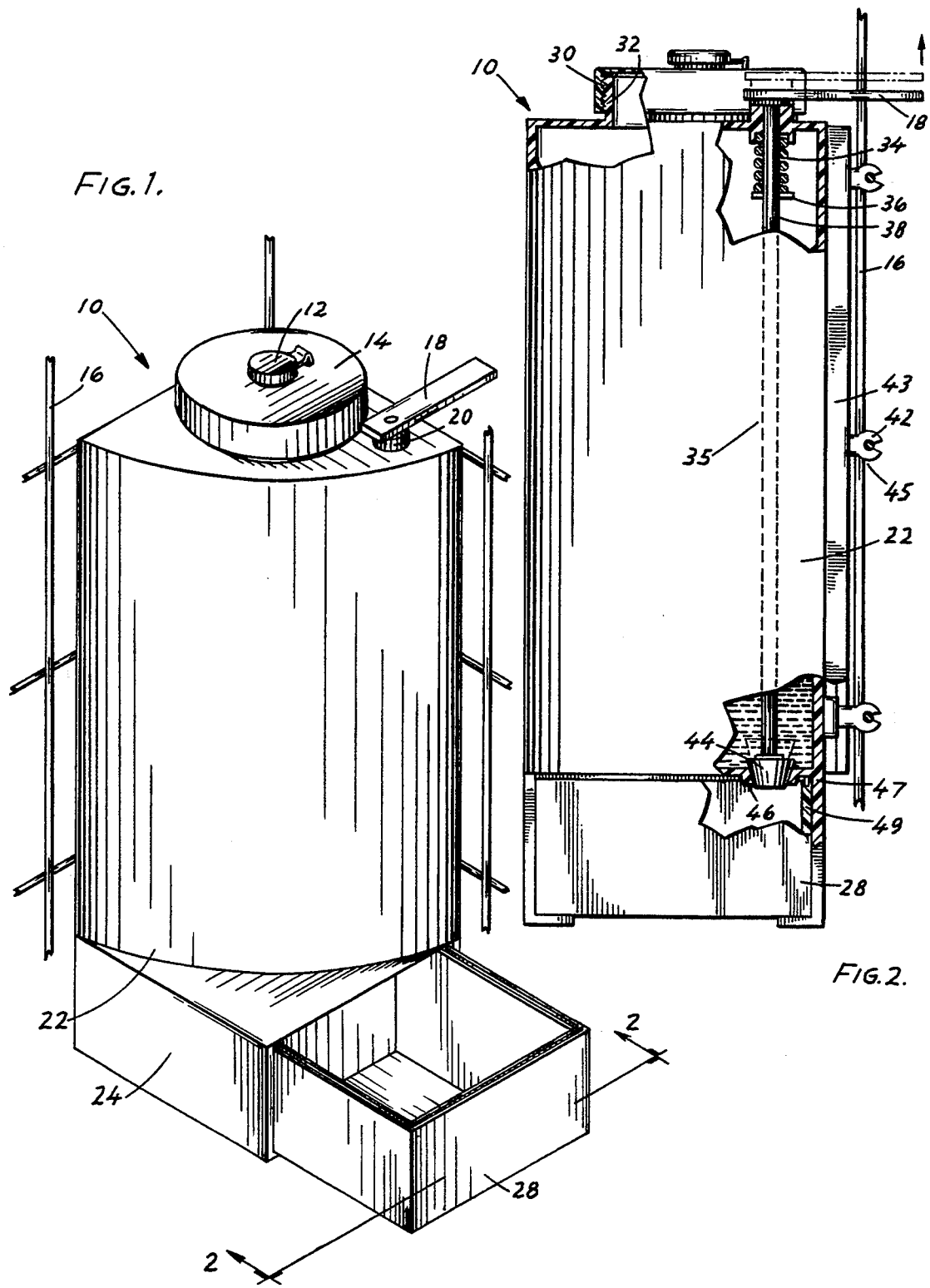

TRANSPORTABLE ANIMAL SUSTENANCE DISPENSING DEVICE

BACKGROUND OF THE INVENTION

1. Field of the Invention

The present invention relates generally to animal sustenance dispensing devices. More particularly, the present invention relates to animal sustenance dispensing devices which are transportable within a crate or cage.

2. Background of the Related Art

Animal sustenance dispensing devices are commonly used for dispensing animal sustenance, such as food or water, to animals. Conventional dispensing devices comprise a bowl or dish upon which the sustenance is placed such that the animal has easy access to the sustenance. The bowl or dish is commonly placed in an animal containment device, such as a crate or cage, which is sometimes used to transport the animal.

A first disadvantage of conventional dispensing devices is that they are prone to spillage. When the owner attempts to transport the crate from one location to a second location, the water will often spill over the side of the bowl and dirty the crate. The owner will be inconvenienced as he must now clean the crate and whatever else has been dirtied near the crate. Alternatively, the owner may decide to empty the bowl before transporting the crate. This solution is inconvenient as well, since the owner must now worry about whether there will be an accessible supply of clean water at the second location.

A second disadvantage of conventional dispensing devices occurs where there is no supply of water at the second location. In this case, the owner must carry a separate supply of sustenance for the animal in addition to carrying the crate. Thus, for example, when the bowl is emptied either because the water has spilled over the side, or simply because the animal has consumed the water, the water must be replaced. It is burdensome for the owner to have to transport a separate water supply in addition to having to transport the animal crate itself.

A third disadvantage of conventional dispensing devices is that they must be replenished frequently and doing so often requires that the owner open up the crate many times during a given period. Thus, for example, the owner may replenish the animal's supply of water daily, each time opening up the crate. Such practice is inconvenient and may be hazardous as well if the animal is unfriendly.

Efforts to overcome these disadvantages have been hampered somewhat by the fact that animal crates are not manufactured uniformly. An important step in providing a dispensing device which is resistant to spillage is to attach the device in some manner to the crate, so as to prevent undesirable movement of the device within the crate during transport. However, because crates are not manufactured uniformly, it is difficult to make a dispensing device which can be attached to a variety of crates. Manufacturers are generally unwilling to produce a dispensing device which fits only one type of crate. Therefore, a bowl or dish is often the only choice animal owners have when equipping their animal's crate with a sustenance dispensing device.

SUMMARY OF THE INVENTION

A transportable animal sustenance dispensing device having a sustenance reservoir is presented. An animal sustenance dispensing device of the present invention comprises a reservoir for storing sustenance; a sustenance container which receives sustenance from the reservoir, the container being movable between a closed container position in which the container is resistant to sustenance spillage and an open container position in which the sustenance is accessible by the animal; and means for controlling flow of the sustenance from the reservoir into the sustenance container. An animal sustenance dispensing device of the present invention further comprises a connector for attaching the dispensing device to an animal containment device.

In accordance with the present invention, a method of dispensing sustenance from a sustenance dispensing device to an animal (the sustenance dispensing device having a reservoir and a sustenance container) comprises the steps of: filling the reservoir with the sustenance; controlling flow of the sustenance from the reservoir to the sustenance container; closing the container, the closing making the container resistant to sustenance spillage; transporting the dispensing device while the container is in the closed container position; opening the container, the opening making the container accessible by the animal; and dispensing the sustenance to the animal while the container is accessible to the animal.

A sustenance dispensing device of the present invention has several advantages. First, the dispensing device is resistant to spillage during transport. While the dispensing device is being transported, the container is in the closed container position, which is resistant to spillage. While the dispensing device is not being transported, the container is in the open container position, which makes the sustenance accessible by the animal. The dispensing device may, if circumstances permit, be in the open position accessible to the pet while the pet is being transported under relatively calm conditions, such as on the seat of a car or plane, but then closed when being transported under more turbulent conditions such as the pet owner carrying the animal crate from the vehicle to another place. Because of these dual positions, the dispensing device can be easily transported without spillage and yet is functional as a dispensing device while stationary.

Second, the dispensing device comprises a reservoir, relieving the owner of the burden of having to carry a separate supply of sustenance during short trips. The owner may store a surplus of sustenance in the reservoir, so that a separate supply is not necessary.

Third, the reservoir also makes it possible for the owner to replenish the supply of sustenance to the crate without having to open the crate. The dispensing device comprises a means for controlling flow of sustenance from the reservoir to the container. The means for controlling includes an actuator, which may be accessed from outside the crate, and a valve. The actuator can be used to open the valve (thereby permitting sustenance to flow into the container) or close the valve (thereby prohibiting sustenance from flowing into the container). Thus, the means for controlling permits the owner to replenish the container with sustenance from the reservoir without having to open up the crate.

Finally, a sustenance dispensing device of the present invention overcomes the difficulty of non-uniform crates by comprising a sustenance container which contains the sustenance and which is accessible by the animal; and a connector for attaching the dispensing device to an animal containment device. The connector includes a track mounted on the dispensing device; a base, the base being slidably mounted within the track; and a fastener, the fastener being mounted to the base and being capable of fastening the animal containment device to the base. The fastener and base can therefore be adjusted to accommodate wire crates having different wire spacings.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications within the scope of the present invention on may be made without departing from the spirit thereof, and the invention includes all such modifications.

BRIEF DESCRIPTION OF THE DRAWINGS

FIG. 1 is a perspective view of an animal sustenance dispensing device which embodies the features of the present invention;

FIG. 2 is a sectioned, side view of a dispensing device of the present invention;

DETAILED DESCRIPTION OF THE PREFERRED EMBODIMENT

Figure 6:
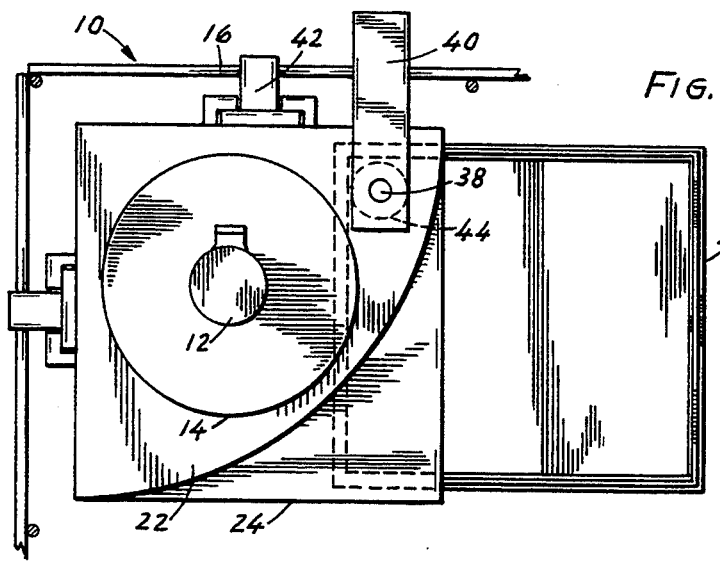
FIG. 6 is a top view of a dispensing device of the present invention.
Figure 4:
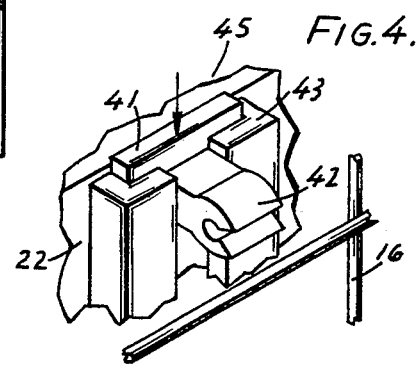
FIG. 4 is a perspective view of a connector for attaching the dispensing device of the present invention to an animal containment device.

Referring now to FIGS. 1 through 4, the structure of a sustenance dispensing device 10 in accordance with the preferred embodiment of the present invention is illustrated. The dispensing device 10 comprises a reservoir 22, a sustenance container 28, a means for controlling 35 the flow of sustenance from the reservoir 22 into the sustenance container 28, and a connector 45 for attaching the dispensing device 10 to an animal containment device such as wire crate 16. The structure of each of these major elements will now be discussed more specifically.

First, the dispensing device comprises reservoir 22. The reservoir 22 has a top which is open-ended but which is covered by a lid 14. Lid 14 has threads 30, and reservoir 22 has threads 32. Threads 30 and threads 32 work together to mount the lid 14 to the reservoir 22. The threads 30 and threads 32 also permit the lid 14 to be removed (by unscrewing the lid 14 from the reservoir 22) so that the reservoir 22 may be refilled.

Figure 3:
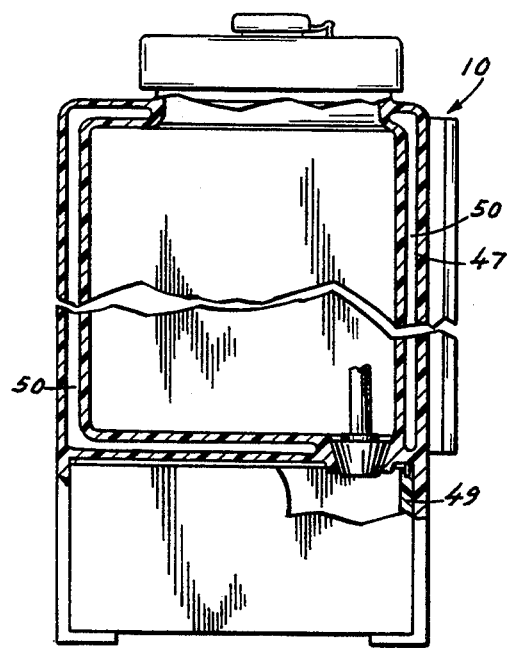
FIG. 3 is a sectioned, side view of a dispensing device of the present invention.

In the preferred embodiment, reservoir 22 is constructed with a conventional insulating material 47, as is more clearly depicted in FIG. 3. Furthermore, reservoir 22 is constructed so that a vacuum region 50 further reduces heat transfer. This construction is particularly useful where the dispensing device 10 is to be used with a relatively cold fluid in hot weather.

Second, the dispensing device comprises sustenance container 28. Sustenance container 28 is movably mounted to a reservoir support unit 24. When container 28 is moved beneath reservoir support unit 24, support unit 24 acts as a cover or lid and thereby closes the container 28. The operation of container 28 will be discussed more fully below.

In the preferred embodiment, container 28 is also constructed with a conventional insulating material 49. Insulating material 49 is different from material 47 only in that the first insulates the container 28 while the latter insulates the reservoir 22. Insulating material 49 is more clearly depicted in FIG. 3.

Third, the dispensing device comprises a means for controlling 35 which controls the flow of sustenance from reservoir 22 into the container 28. Means for controlling 35 includes an actuator 18, a spring 34, an annular spring support 36, a transferring member such as rod 38, an elastomeric stopper valve 44, and a valve seat 46. The operation of means for controlling 35 will be discussed more fully below.

Finally, dispensing device 10 further comprises connector 45. The connector is more clearly illustrated in FIG. 4. Connector 45 attaches the dispensing device 10 to wire crate 16 and includes a base 41, a track 43, and a slidable fastener 42. The base 41 is slidably mounted within the track 43, which is fixedly mounted to the reservoir 22. The fastener 42 is capable of fastening the crate 16 to the base 41, and can be used with virtually any wire crate.

In the preferred embodiment, track 43 comprises two opposing L-shaped members. Additionally, base 41 is a generally flat member which slidably fits between the opposing members. Finally, the fastener 42 is a resilient plastic C-clip capable of grasping wire crate 16, rather than some other type of animal containment device. This embodiment is preferred for its simplicity, ease of construction, and general usefulness. It should be apparent, however, that it is possible to use this slidable connector with other non-wire animal containment devices simply by using a different type of fastener. Fastener 42 may comprise a fastening mechanism more elaborate than that illustrated.

Figure 5:
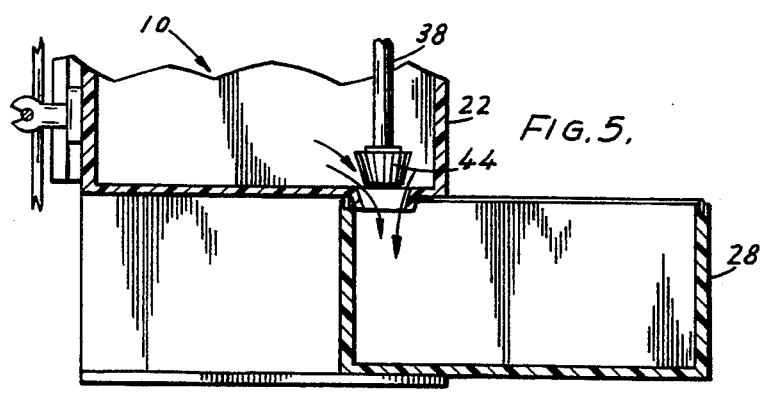
FIG. 5 is a sectioned, side view of the present invention with a container in a position accessible by an animal.

Referring now also to FIGS. 5 and 6, operation of the sustenance dispensing device 10 is illustrated. In operation, animal sustenance is stored in reservoir 22 and in container 28. An animal accesses the sustenance through an upper opening container 28. The means for controlling 35 controls the flow of sustenance from the reservoir 22 to the container 28. Each of these major aspects of operation will now be discussed more thoroughly.

Container 28 is movably mounted and thus has a closed container position and an open container position. In the closed container position, the container 28 is located inside the support unit 24. When container 28 is moved inside support unit 24, a seal is formed making the combination resistant to spillage. Thus, this movement acts to close the container 28, putting the container 28 in a closed container position.

In the open container position, container 28 is accessible to the animal, as shown in FIG. 5. When container 28 is moved outside support unit 24, there is no longer a seal and the container becomes accessible to the animal. Thus, this movement acts to open the container 28, putting the container 28 in an open container position. Because of these dual positions, the dispensing device 10 can be easily transported without spillage and yet is functional as a dispensing device while stationary.

In the preferred embodiment, the container 28 is opened and closed in a drawer-like fashion. However, it should be apparent that there are other ways of opening and closing a container. For example, the container could remain stationary while a lid is placed over the container. This lid could be stored, for example, underneath the reservoir when the dispensing device is stationary, and pulled out from underneath the reservoir and placed over the container when the dispensing device is in transport.

The flow of sustenance from the reservoir 22 into the container 28 is accomplished by means for controlling 35. Means for controlling 35 comprises actuator 18 which moves stopper valve 44 between a closed stopper position and an open stopper position.

When actuator 18 is in a rest position, as shown, elastomeric stopper valve 44 is firmly pressed against valve seat 46, thereby creating a seal. Coil spring 34 exerts a force against annular spring support 36 which presses stopper valve 44 into place, and serves to bias the valve toward the closed valve position.

When an upward force is exerted against the actuator 18, typically by the owner of the animal, that force will be transmitted to rod 38 which will further transmit the force to stopper valve 44 thereby causing it to lift. When stopper valve 44 is lifted, water will flow into the container 28, as shown in FIG. 6.

In the preferred embodiment, as shown in FIG. 6, stopper valve 44 is placed with respect to container 28 so that water will always be able to flow into the container 28, even when the container 28 is accessible to the animal.

It should be apparent that the dispensing device can be particularly adapted for use with either food or water by varying the size of the stopper valve 44 and the valve seat 46. Additionally, it should be apparent that the size of the stopper valve 44 and the valve seat 46 may be adjusted so that the dispensing device is generic and may be used with either food or water.

Figure 7:
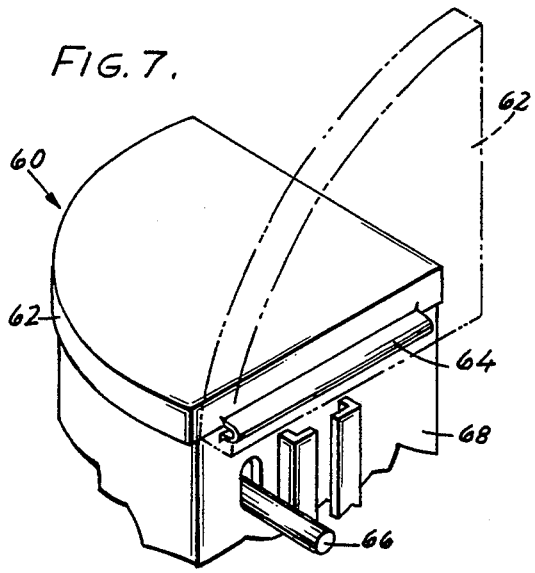
FIG. 7 is a perspective view of an alternative embodiment of the present invention.

An alternative embodiment of the present invention is shown in FIG. 7. In FIG. 7, the dispensing device 60 has a hinged lid 62. The hinged lid 62 is mounted to reservoir 68 by a hinge 64. To accommodate the lid 62 which takes up the entire top surface of the reservoir 60, an actuator 66 now protrudes horizontally from the reservoir 68. Actuator 66 controls a stopper valve in a manner similar to actuator 18 in dispensing device 10.

It is to be understood that the embodiments of the present invention not disclosed herein are fully intended to be within the scope of the appended claims.

I claim:

1. A device for dispensing sustenance to an animal, said dispensing device comprising:
   A. a reservoir for storing sustenance;
   B. a sustenance container which receives sustenance from said reservoir, said container being movable between a closed container position in which said container is resistant to sustenance spillage and an open container position in which said sustenance is accessible by said animal; and
   C. means for controlling flow of said sustenance from said reservoir into said sustenance container, said means for controlling comprising:
      1. an actuator;
      2. a valve, said valve being in fluid communication with said reservoir and said sustenance container, said valve permitting the flow of sustenance from said reservoir into said sustenance container while in an open valve position and prohibiting the flow of sustenance while in a closed valve position; and
      3. a transferring member, said transferring member being capable of transferring a force from said actuator to said valve so as to move said valve in response to force applied to said actuator.

2. A dispensing device as in claim 1, wherein said means for controlling further comprises a spring, said spring biasing said valve toward said closed valve position.

3. A dispensing device as in claim 1, further comprising a connector for attaching said dispensing device to an animal containment device, said connector including:
   A. a track;
   B. a base, said base being slidably mounted within said track; and
   C. a fastener, said fastener being mounted to said base and being capable of fastening said animal containment device to said base.

4. A dispensing device as in claim 1, wherein said reservoir has an open-ended top portion, and further comprising a lid which is mounted on said top portion of said reservoir and which prevents sustenance from spilling out of said top portion of said reservoir.

5. A dispensing device as in claim 4, wherein said lid is mounted to said reservoir by a hinge.

6. A dispensing device as in claim 4, wherein said lid is threadedly mounted to said top portion of said reservoir.

7. A device for dispensing sustenance to an animal, said dispensing device comprising:
   A. a reservoir for storing sustenance;
   B. a sustenance container, said container being movable between a closed container position in which said container is resistant to sustenance spillage and an open container position in which said sustenance is accessible to said animal; and
   C. a connector for attaching said dispensing device to an animal containment device, said connector including:
      (1) a track, said track comprising two opposing members;
      (2) a base, said base being slidably mounted within said track; and
      (3) a fastener, said fastener being fixedly mounted to said base and being capable of fastening said animal containment device to said base; and
   D. means for controlling flow of said sustenance from said reservoir into said sustenance container, said means for controlling including:
      (1) an actuator;
      (2) a stopper valve, said valve being in fluid communication with said reservoir and said sustenance container, said valve permitting the flow of sustenance from said reservoir into said sustenance container while in an open valve position and prohibiting the flow of sustenance while in a closed valve position; and
      (3) a transferring member, said transferring member being capable of transferring force from said actuator to said valve so as to move said valve in response to movement of said actuator.

* * * * *